United States Patent [19]

Lauber

[11] 4,241,803
[45] Dec. 30, 1980

[54] WHEEL-SUPPORT ASSEMBLY FOR ROLLING AND STEPPING VEHICLES, ESPECIALLY CRANES, EXCAVATING MACHINERY AND THE LIKE

[75] Inventor: Ernst Lauber, Thun, Switzerland
[73] Assignee: Willy Habegger, Thun, Switzerland
[21] Appl. No.: 14,594
[22] Filed: Feb. 23, 1979
[51] Int. Cl.³ .................. B62D 57/02; B66C 23/62
[52] U.S. Cl. ............................ 180/8 R; 212/189; 280/765; 180/8 E
[58] Field of Search ............... 212/145; 280/765–769, 280/763, 43.23, 708, 709, 711, 6 H, 6.1, 6.11, 6 R, 95 R; 180/8 R, 8 E

[56] References Cited
U.S. PATENT DOCUMENTS

| | | | |
|---|---|---|---|
| 3,826,450 | 7/1974 | Currey et al. | 280/765 |
| 3,841,663 | 10/1974 | Proffit | 280/766 |
| 3,887,209 | 6/1975 | Blanc | 280/43.23 |
| 3,912,289 | 10/1975 | Czajkowski, Jr. | 280/6.1 |
| 4,116,459 | 9/1978 | Kreitzberg | 280/474 |

FOREIGN PATENT DOCUMENTS

| | | | |
|---|---|---|---|
| 202208 | 11/1973 | Australia | 212/145 |
| 609709 | 9/1960 | Italy | 280/765 |

Primary Examiner—Stephen G. Kunin
Assistant Examiner—Lawrence E. Williams
Attorney, Agent, or Firm—Karl F. Ross

[57] ABSTRACT

A wheel support (outrigger) for a rolling and stepping vehicle, especially a crane, excavator or like agricultural, industrial or construction machine in which a leg carries a wheel and is, in turn, connected by a parallelogrammatic linkage to a knuckle which articulates the parallelogrammatic linkage to the vehicle chassis. A further knuckle is provided between the wheel or its leg and the parallelogrammatic linkage. The wheel-carrying outrigger is swingable in a vertical plane while the first knuckle is provided with a vertical pivot axis on the chassis. The outrigger is also provided with an actuating device, preferably a fluid-powered cylinder, which swings the outrigger.

6 Claims, 5 Drawing Figures

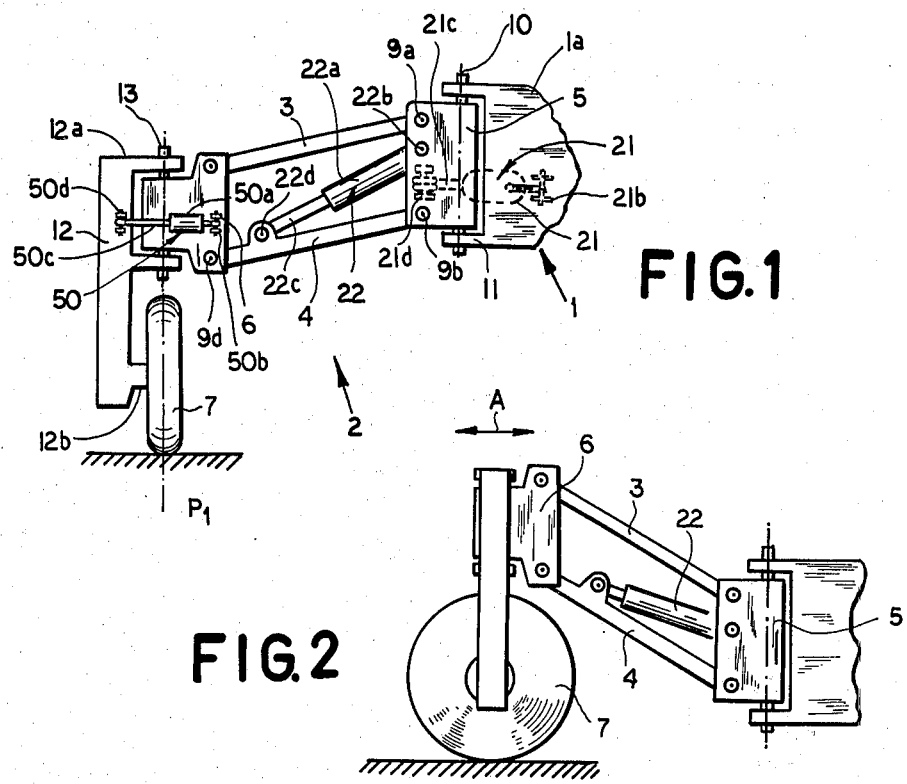
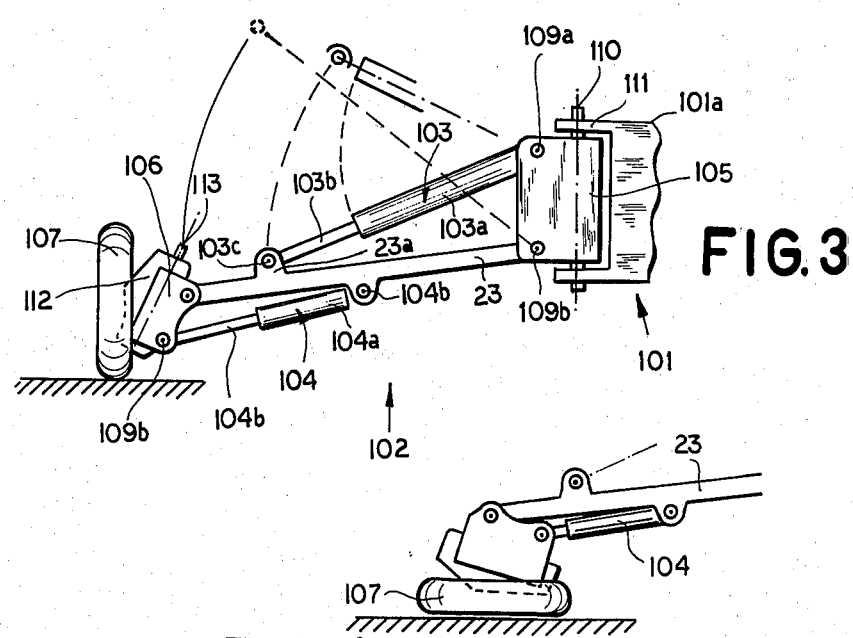

WHEEL-SUPPORT ASSEMBLY FOR ROLLING AND STEPPING VEHICLES, ESPECIALLY CRANES, EXCAVATING MACHINERY AND THE LIKE

CROSS REFERENCE TO RELATED APPLICATIONS

The present application is related to my commonly assigned, concurrently filed copending applications Ser. No. 014,687 and Ser. No. 014,593, both of which are hereby incorporated in their entirety by reference.

FIELD OF THE INVENTION

The present invention relates to an outrigger assembly for rolling and stepping vehicles and, more particularly, to a wheel-carrying outrigger for industrial, construction and agricultural machinery, especially cranes and excavators.

BACKGROUND OF THE INVENTION

Cranes and excavators, as well as various other types of agricultural, industrial and construction machines, have heretofore been provided with wheels which are connected at fixed locations to the chassis and with outriggers which may be provided to support the chassis or vehicle body in various attitudes and to various degrees upon the ground. The outriggers may be formed with legs which are telescopingly extensible so that a pad or the like can rest upon the ground and can support the vehicle body which may be lifted to elevate the wheels above the ground.

It is also known to provide wheel-carrying assemblies which are provided on rigid traveling legs or legs which are hinged at fixed locations to the chassis to cooperate with a vehicle body which is capable of rolling and/or stepping movement along the ground.

For example, the vehicle body may have arms which are themselves hinged to a central support member so that the vehicle body may be raised into a portal or gantry configuration or lowered into a compact configuration with the center of the body close to the ground.

Such traveling outriggers enable the desired attitude of the vehicle to be maintained when the vehicle is used upon irregular terrain.

One of the problems encountered with earlier systems in which rolling and/or stepping travel is required, is that the usual wheel suspension or support does not permit rolling travel or travel on steep, banked or stepped terrain to a satisfactory degree.

OBJECTS OF THE INVENTION

It is the principal object of the present invention to provide a wheel assembly which facilitates rolling and stepping travel of a vehicle over normal flat terrain as well as upon hilly, mountainous or like irregular terrain, and which greatly increases the versatility of the vehicle.

Another object of this invention is to provide an improved outrigger assembly for an earth-working (excavating), construction, industrial or agricultural machine.

SUMMARY OF THE INVENTION

These objects and others which will become apparent hereinafter are attained with a wheel-support assembly which provides a traveling leg or outrigger which is formed with a parallelogrammatic linkage connected at one end to a first knuckle or head which is hinged to the vehicle body, e.g. at one of the arms thereof when the latter is of the rolling and stepping type (e.g. as described in the copending application Ser. No. 014,593, while the other end of the parallelogrammatic linkage is provided with another pivot head or knuckle connecting it to a wheel, e.g. through a wheel leg or to some other wheel-carrying member.

According to an important feature of the invention, the parallelogrammatic linkage has its link members swingable about horizontal axes on the first-mentioned knuckle or head and on the second knuckle or head to enable the traveling outrigger to be swingable in a vertical plane.

Another important feature of the invention is that the first knuckle, which is formed as a crosshead, is swingable about a vertical pivot axis relative to the rolling and stepping vehicle body, e.g. one of the arms thereof, to enable the outrigger to swing in a horizontal plane.

The traveling outrigger is, moreover, provided with an actuating device, preferably a fluid-powered cylinder arrangement, which controls the swinging movement of the outrigger, this device being provided to displace the parallelogrammatic linkage for forming a part thereof.

The present invention is based upon my discovery that the provision of the outrigger as a parallelogrammatic linkage enables the wheel at the free end thereof to be shifted into any desired height position in the vertical plane while maintaining the plane of the wheel perpendicular to the surface which engages it. The system, however, also permits the wheel to be positioned relative to the body in a variety of locations in the horizontal plane of the swing of the outrigger and thereby improves the ability to displace the vehicle along irregular terrain in any desired direction and to position the vehicle body at any desired attitude independently of any sloped or stepped configuration of the terrain. While the vehicle is traveling, therefore, the outrigger can be swung in the vertical and horizontal planes to accommodate for the irregular terrain and permit the vehicle to travel over various rises and depressions without changing the attitude or inclination of the vehicle body to which the parallelogrammatic linkage is articulated. The wheel spread of the vehicle can be selected at will so that the vehicle can have a narrow or wide track and can be displaced with ease even where only narrow tracking capabilities can be accommodated. A relatively wide spread of the wheels can be used where greater support is desired.

In general, the vehicle will be provided with at least three outriggers of the type of the present invention at the ends of arms of the vehicle body which are hinged to a central member so that the vehicle can be raised into a gantry or portal configuration to clear any ground obstructions or to raise a load or so as to navigate a steep grade or stepped terrain without inclination of the central member. When the outriggers are swung inwardly, therefore, the degree to which the central portion of the body can be raised is markedly increased.

Furthermore, the outriggers can be used without hinged arms to effect the switchover between a gantry or raised configuration or a compact lowered configuration solely by the use of the outriggers.

According to a further feature of the invention, the crosshead or first knuckle is preferably pivotally mounted in a fork of the rolling and stepping body so as to be swingable about the aforementioned vertical axis.

The second knuckle or pivot head can carry the wheel directly although it is advantageous to form the pivot head or second knuckle so that it is articulated to a fork-shaped wheel carrier with a vertical or inclined steering axis.

According to a further feature of the invention, the wheel may be so mounted on the second knuckle or pivot head or connected to the parallelogrammatic linkage that it can be swung about a horizontal axis so that the plane of the wheel lies parallel to the plane of the ground (i.e. is horizontal) to form a large-area pad upon which the vehicle can be supported or which prevents rolling movement of the vehicle. The wheel carrier can engage the second knuckle or pivot head via a kingpin.

In a preferred embodiment of the present invention and the best mode currently known to me for carrying it out in practice, the pivot head is connected articulatingly to a fork bent at right angles to a wheel leg with the fork and the pivot head defining a vertical steering axis, the fork ends overlapping the pivot head and defining therewith a free space in which a steering device can be received.

In combination with this feature it has been found to be advantageous to form the wheel leg as a telescopingly elongabable member, e.g. with a telescopingly extensible ram provided with a support pad or foot adjacent the wheel. The wheel can then be connected to the wheel leg by a vertically swingable lever or arm, a fluid-powered device, e.g. a cylinder, being connected between the wheel leg and the wheel-carrying lever for swinging the latter.

The resulting structure has been especially effective for the three-dimensional positioning of a wheel with respect to the vehicle body and at the same time enabling steering of the wheel as may be required. The system has been found to be especially effective for stepping movement by the use of the support ram and telescoping leg, to facilitate positioning of the central portion of the vehicle body at various heights, and in accommodating various round inclinations as described in the aforementioned copending application Ser. No. 014,593.

The wheel assembly of the invention is especially effective for a vehicle body of a spider configuration and a stopping or blocking mechanism can be provided between the pivot head or second knuckle and the fork of the wheel leg when it is necessary to resist lateral force components.

The actuating devices for the outrigger of the present invention can be piston-and-cylinder arrangements disposed on both sides of the first knuckle or crosshead and connected to the vehicle body. In this case, the selective actuation of the cylinder can enable the knuckle or crosshead to be rotated about its vertical axis (horizontal movement of the outrigger) and the parallelogrammatic linkage to be raised and lowered.

At least one piston-and-cylinder arrangement can be provided diagonally between the parallelogrammatic links and can be connected to the knuckle or crosshead.

Cylinder arrangements can thus be provided to effect swinging movement of the wheel carrier in a vertical plane and of the parallelogrammatic linkage in horizontal senses.

The linkage can also have a single nonextensible link member, rather than two nonextensible parallel link members, the single link member being raised and lowered by a first cylinder arrangement while a further or second cylinder arrangement pivots the wheel carrier relative to the nonextensible link to maintain the wheel in a vertical plane in all positions of the nonextensible link member in its vertical plane even without a wheel leg by appropriate pressurization of the two cylinders.

The second cylinder can also be actuated to swing the wheel into a horizontal position for use as a support pad.

According to a further feature of the invention, the wheel is provided with a wheel carrier formed with a fork which is angularly displaceable through at least 180° relative to the pivot head for steering movement of the wheel, i.e. for longitudinal and transverse roving displacement of the vehicle.

When the wheel carrier is provided with a king pin which is journaled in the pivot head, the wheel may be pivoted about a vertical axis or a substantial vertical axis through almost 360°.

In another embodiment of the invention, the parallelogrammatic linkage is formed with link members constituted as piston-and-cylinder arrangements. When two such cylinder arrangements are provided, a nonextensible link member can be provided between them.

In this case, the upper cylinder or parallelogrammatic-linkage member is connected to the top of the crosshead and to the nonextensible link member while the lower parallelogrammatic-linkage cylinder is connected below the nonextensible member and to the latter. This latter cylinder is also connected to the pivot head and the two cylinder members can be pressurized simultaneously to maintain the vertical orientation of the wheel while the linkage is swung in the vertical plane. When the latter or second cylinder is contracted, the wheel is swung into its horizontal position.

The system of the invention has the advantage that the suspension can be used highly effectively for rolling and stepping vehicles which must travel along inclined, stepped or like irregular terrain while maintaining a predetermined orientation of the central portion of the vehicle body. This is achieved by the three-dimensional swinging capabilities of the wheel suspension.

The system also permits a stepping movement in practically any direction as well as a climbing movement (see especially the aforementioned copending application Ser. No. 014,593.

Furthermore, the purchase of the structure on any terrain is extremely stable and the suspension itself is of relatively simple, reliable and easily maintained construction.

BRIEF DESCRIPTION OF THE DRAWING

The above and other objects, features and advantages of the present invention will become more readily apparent from the following description, reference being made to the accompanying drawing in which:

FIG. 1 is an elevational view, partly in diagrammatic form, of a parallelogrammatic wheel suspension in accordance with a feature of the invention;

FIG. 2 is a view similar to FIG. 1, with portions removed, illustrating another position of the apparatus of FIG. 1;

FIG. 3 is a view similar to FIG. 1 but illustrating another embodiment of the invention;

FIG. 4 is a partial elevational view of the wheel suspension of FIG. 3 showing the wheel in its horizontal orientation for use as a pad.

SPECIFIC DESCRIPTION

Figure 5:
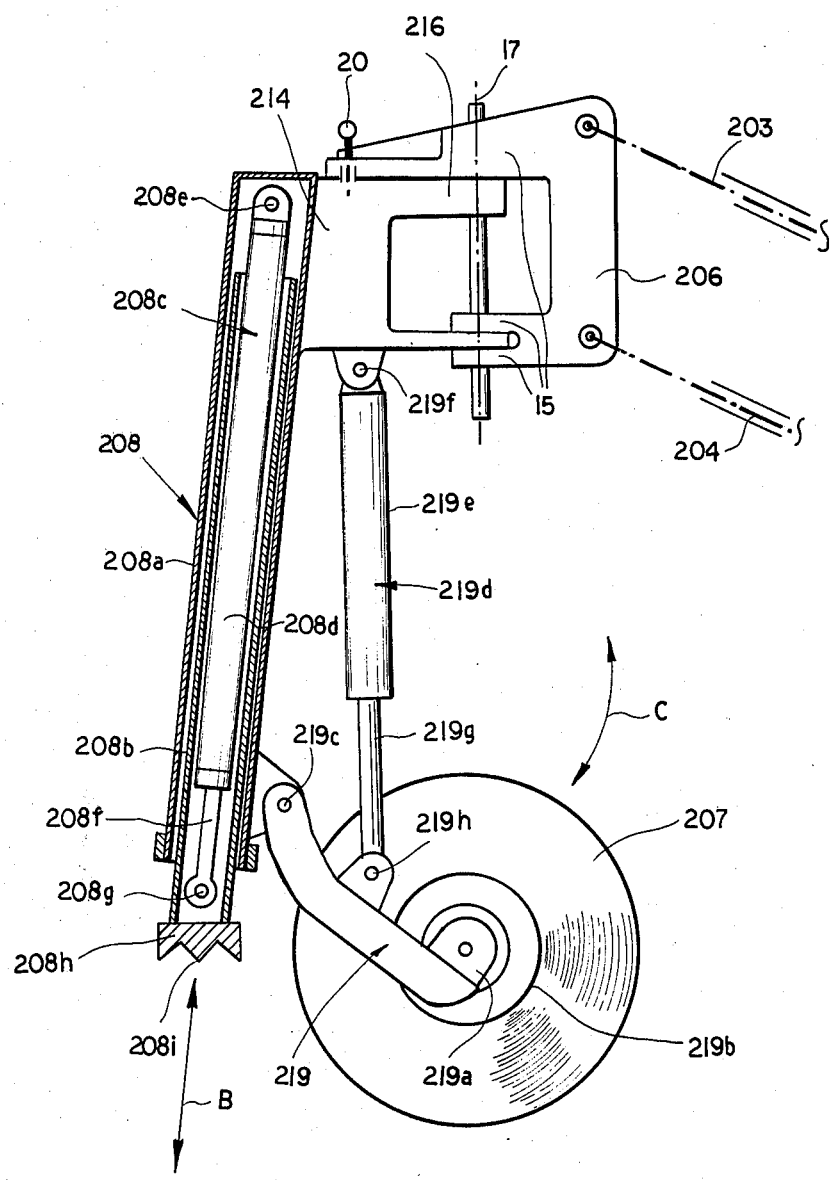
FIG. 5 is an elevational view in diagrammatic form and partly in cross section illustrating another wheel suspension according to the invention.

The wheel suspension shown in FIGS. 1 through 5 of the drawing are all intended to be mounted on a spider-shaped vehicle for a crane or excavator of the type described in the aforementioned copending application Ser. No. 014,593 which more fully describes the rolling and stepping operations of the vehicle as well as its climbing capabilities. Details of the wheel leg of the embodiment of FIG. 5 can be found in the copending application Ser. No. 014,687, the copending applications mentioned being incorporated herein by reference.

In FIGS. 1 and 2 of the drawing I have shown a rolling and stepping vehicle 1, one of whose arms 1a has been illustrated only diagrammatically and in part.

Each of these arms may carry a wheel suspension represented at 2 in the form of a traveling leg. The term "traveling leg" is used herein to describe all of the structure between the wheel 7 and the vehicle arm 1a. In certain of the embodiments described, the traveling leg will also include a wheel leg although such a wheel leg is not always required as will be seen from FIGS. 3 and 4.

The wheel leg carrying the wheel 7 shown in FIGS. 1 and 2 has been represented at 12 and is provided with a laterally extending fork or bifurcated head 12a which is connected by a steering pivot 13, illustrated only diagrammatically, with a pivot head 6.

The parallelogrammatic linkage here comprises a pair of rigid nonextensible parallel link members 3 and 4 which are pivotally connected one above the other and at 9a and 9b, respectively, in a common vertical plane, to a crosshead 5. The latter is, in turn, pivotally connected at 10 to the arm 1a. The vertical pivot 10 allows swinging movement of the entire traveling leg in horizontal senses under the control of a hydraulic piston-and-cylinder arrangement represented diagrammatically at 21. The cylinder 21a of this arrangement is hinged at 21b to the arm 1a while the piston 21c is articulated at 21d to the crosshead 5.

A similar hydraulic cylinder arrangement has been represented only diagrammatically at 50 in FIG. 1 and has a cylinder 50a connected pivotally to the head 6 at 50b while its piston 50 is pivotally connected at 50d to the fork 12a. This allows swinging movement of the leg 12 and the wheel 7 relative to the head 6 between the positions illustrated in FIGS. 1 and 2.

The parallelogrammatic links 3 and 4 are also pivotally connected at 9c and 9d to the head 6.

A hydraulic piston-and-cylinder arrangement 22 can comprise a cylinder 22a articulated at 22b to the crosshead 5 and provided with a piston 22c pivotally connected at 22d to the lower link 4.

The cylinder arrangement 22 effects a swinging movement of the parallelogrammatic linkage in a vertical plane with the wheel 7 being maintained in its vertical attitude. The axis of pivot 13 can coincide with a vertical median plane P' through the wheel 7. The wheel 7 is journaled at 12b to the vertical leg 12 and can be provided with a hydraulic motor if the wheel is designed for propulsion of the vehicle.

In FIG. 1 the traveling leg 12 is shown in a downwardly swung position, corresponding to a raised orientation of the vehicle body, for travel in a direction perpendicular to the plane of the paper. In the embodiment of FIG. 2, the wheel 7 has been swung at right angles to the wheel in FIG. 1 and the parallelogrammatic linkage has been swung upwardly to lower the central portion of the vehicle body. Here the direction of travel may be the direction of arrow A.

In the embodiment of FIGS. 3 and 4, the parallelogrammatic linkage is formed by a pair of extensible links 103 and 104 which are generally parallel to one another.

In this case, the crosshead 105 is pivotally connected to an arm 101a of the vehicle 101 at a bifurcation 111 which is substantially equivalent to the fork 11 of the embodiment of FIGS. 1 and 2. The resulting pivot 110 permits swinging movement of the traveling leg 102 in a horizontal sense, e.g. under the control of a cylinder which can be identical to that shown at 21 and thus has not been illustrated in the embodiment of FIG. 3.

The upper extensible leg 103 is a hydraulic cylinder arrangement whose cylinder 103a is pivotally connected at 109a to the cross head 105 at an upper location. The piston 103b of the cylinder arrangement 103 is pivotally connected at 103c to a lug 23a of an inextensible or rigid link 23. The link 23 is pivotally connected at one end to the crosshead 105 at 109b.

The second extensible member of the parallelogrammatic linkage is the cylinder 104 mentioned previously and this comprises a cylinder body 104a pivotally connected at 104b to the links 23 on the underside of the latter. The piston 104b of the cylinder arrangement 104 is pivotally connected at a lower pivot point 109d to a pivot head 106 provided with a kingpin 113 in which the fork-shaped wheel carrier 112 is swingably mounted for steering movement of the wheel 107 journaled on this carrier.

In this embodiment, the hydraulic fluid is metered to the cylinders 103, 104 so that vertical attitude of the wheel 107 can be maintained as the traveling leg 104 is swung between its lower solid line position in FIG. 3 into an upper broken line position as has been diagrammatically illustrated. Thus the traveling wheel of FIG. 3 is capable of the same up and down movements as the traveling wheel 2 in FIG. 1.

However, the embodiment of FIG. 3 is also capable of a rotation of the wheel into a horizontal position so as to act as a support pad as has been shown in FIG. 4 by contraction of the cylinder arrangement 104. In this position, the vehicle is firmly supported against movement along the ground.

In this embodiment, as in the embodiment of FIGS. 1 and 2, the wheel 104 can be provided with a hydraulic motor or other propulsion device which can be received in the carrier 112.

A comparison of the embodiments of FIGS. 1 and 2 with that of FIGS. 3 and 4 shows that in the embodiment of FIGS. 1 and 2, the parallelogrammatic links are rigid and are shifted by a separate cylinder 22 which is disposed substantially diagonally between the two parallelogrammatic links. In the embodiments of FIGS. 3 and 4, however, the parallelogrammatic link members are themselves cylinders which are connected to the rigid link and to respective pivot heads.

While mention has been made of the fact that each of the wheels of the vehicle may be self-propelled, i.e. provided with a respective hydraulic motor, it should be also clear that the wheels may equally be provided with respective brakes which can, for example, be constituted by the same hydraulic motor.

For example, for a four-wheel vehicle, braking of both left vehicle wheels while the right wheels are propelled enables the vehicle to take a tight left turn while braking of both right wheels while the left wheels are propelled permits the vehicle to take a sharp right turn. With forward drive of the right wheels and rearward drive of the left wheel, the vehicle can turn in place.

In FIG. 5 we have shown an embodiment in which the parallelogrammatic linkage is represented at 203, 204 and can be analogous to the linkage of FIGS. 1 and 2. Naturally the linkage of FIGS. 3 and 4 can also be provided.

Here the pivot head 206 is provided with a steering pivot 17 and is constituted as a fork receiving the bifurcated head 216 of a wheel leg 208 which can be of the type described in the aforementioned copending application Ser. No. 014,687.

Thus, the leg 208 can be provided as a hollow tubular structure 208a which is of rectangular cross section and which telescopingly receives an inner tubular member 208b forming a ram which is displaceable in the direction of the arrow B.

To effect displacement of the ram 208b, there is provided a self-contained cylinder arrangement 208c which comprises a cylinder 208d which is pivotally connected at 208e to the upper end of the outer tube 208a.

The piston 208f is pivotally connected at 208g to the lower end of the ram 208b which is provided with a removable pad 208h having teeth 208a to allow the traveling leg to be placed on the ground to support the vehicle with the wheel 207 raised. In this environment of the invention, the wheel 207 is journaled at one end 219a of a lever or arm 219 and can be propelled by a hydraulic motor 219b.

At its opposite end, the lever 219 is articulated at 219c to the lower end of the leg 208.

A cylinder arrangement 219d comprises a hydraulic cylinder for a pneumatic cylinder 219e articulated at 219f to the underside of a fork 214 laterally extending from the leg 208 and rigid therewith. The piston 219g of the cylinder arrangement 219 is pivotally connected at 219h to the arm 219 between its extremities. The cylinder 219d, which serves to raise or lower the wheel and thus swing the wheel to its rolling position shown in FIG. 5 or out of this position so that the pad 208h can support the vehicle on the ground, can also serve as a shock absorber during rolling travel of the vehicle.

A locking mechanism 20 is provided between the pivot head 206 and the fork 214 so as to lock the wheel in the position shown in FIG. 5 or a position rotated relatively thereto about the axis of pivot 17, depending upon the direction of travel of the vehicle. The space 18 between the bifurcated pivot head 206 and the fork 214 may accommodate a steering arrangement for the wheel 207. In this environment, the axis of pivot 17 should coincide as much as possible with the center of the wheel 207.

The vertical movement of the wheel length shown in FIG. 5 by the parallelogrammatic linkage 203,204 is effected as described in connection with FIGS. 1 and 2. In either the raised or lowered position of the parallelogrammatic linkage, however, the wheel 207 can be swung downwardly for rolling travel into the position shown in FIG. 5 or upwardly as represented by the arrow C to allow the pad 208 to engage the ground and support this portion of the vehicle against movement.

I claim:

1. In a rolling and stepping vehicle having a machine support, at least one traveling leg comprising:
   a crosshead pivotally mounted on said support for rotation about a vertical axis;
   a first piston-and-cylinder arrangement connected between said support and said crosshead for angularly displacing said crosshead about said axis;
   a pair of substantially parallel elongated link members pivotally connected to said crosshead at respective substantially horizontal axes and disposed one above the other in spaced apart relationship to define a parallelogrammatic linkage;
   a pivot head pivotally connected to said link members at respective spaced apart substantially horizontal axes for swinging displacement by said parallelogrammatic linkage relative to said support;
   a wheel assembly pivotally connected to said pivot head and defining therewith an axis about which a wheel of said assembly is pivotal relative to said pivot head; and
   a second piston-and-cylinder arrangement lying generally diagonally with respect to said parallelogrammatic linkage and connected between one of said heads and one of said members at opposite ends of said linkage for swinging said linkage in a substantially vertical plane.

2. The vehicle defined in claim 1 wherein said support is formed with a fork receiving said crosshead for pivotal movement about the first-mentioned vertical axis, said wheel assembly includes a fork-shaped wheel carrier pivotally connected to said pivot head, and a third piston-and-cylinder arrangement connected between said pivot head and said carrier for steering said vehicle.

3. The vehicle defined in claim 1 or claim 2 wherein said wheel assembly includes a telescoping ram extensible to support the wheel of said assembly above the ground.

4. The vehicle defined in claim 2, further comprising means for pivotally mounting said wheel on said carrier for swinging movement about a horizontal axis and hydraulic means connected between said carrier and said wheel for displacing same about the last-mentioned horizontal axis.

5. The vehicle defined in claim 1 or claim 2, further comprising locking means for releasably retaining said wheel assembly in a predetermined angular relationship with said pivot head.

6. The vehicle defined in claim 1 or claim 2 wherein said second piston-and-cylinder arrangement is pivotally connected between an upper portion of said crosshead and a lower one of said members.

* * * * *